(12) United States Patent
Lee et al.

(10) Patent No.: US 8,159,765 B2
(45) Date of Patent: Apr. 17, 2012

(54) BARREL MODULE AND IMAGING APPARATUS INCLUDING THE SAME

(75) Inventors: Chan-ho Lee, Suwon-si (KR); Young-eun Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 12/716,460

(22) Filed: Mar. 3, 2010

(65) Prior Publication Data
US 2010/0226024 A1 Sep. 9, 2010

(30) Foreign Application Priority Data

Mar. 5, 2009 (KR) .................. 10-2009-0018914
Feb. 17, 2010 (KR) .................. 10-2010-0014279

(51) Int. Cl.
*G02B 7/02* (2006.01)
(52) U.S. Cl. ............... 359/824; 359/826; 359/818
(58) Field of Classification Search .......... 359/811, 359/813, 819–824
See application file for complete search history.

(56) References Cited

U.S. PATENT DOCUMENTS

| 7,177,103 B2 * | 2/2007 | Yamashita et al. ........... 359/822 |
| 2010/0208361 A1 * | 8/2010 | Oh et al. ..................... 359/695 |

* cited by examiner

*Primary Examiner* — Joseph P Martinez
*Assistant Examiner* — Brandi Thomas
(74) *Attorney, Agent, or Firm* — Drinker Biddle & Reath LLP

(57) ABSTRACT

A barrel module and an imaging apparatus including the same. The barrel module includes: a base having a surface on which an image pickup device is disposed; a lens barrel disposed on the base; a driver for providing driving power to move the lens barrel up and down over the base; a clip connected to the driver to be disposed between the driver and the lens barrel; and an elastic member for providing elasticity between the lens barrel and the clip, wherein the lens barrel moves from an original position toward the base according to an external force is applied, and when the external force is removed, the lens barrel goes back to the original location due to the elasticity of the elastic member.

14 Claims, 7 Drawing Sheets

BARREL MODULE AND IMAGING APPARATUS INCLUDING THE SAME

CROSS-REFERENCE TO RELATED PATENT APPLICATIONS

This application claims the benefit of Korean Patent Application No. 10-2009-0018914, filed on Mar. 5, 2009, and Korean Patent Application No. 10-2010-0014279, filed on 17 Feb. 2010, in the Korean Intellectual Property Office, the entire disclosure of both applications are herein incorporated by reference.

BACKGROUND OF THE INVENTION

1. Field of the Invention

The present invention relates to a barrel module of an imaging apparatus, and an imaging apparatus including the barrel module.

2. Description of the Related Art

An apparatus for capturing a digital image stores a still image or a moving image captured of a subject in a digital file. Examples of the apparatus include a digital still camera (DSC), a digital video camera (DVC), and a digital camera installed in a mobile phone.

Generally, the apparatus includes a barrel module and a camera body. The barrel module is installed in front of the camera body, and includes an optical lens for inducing and forming the image of the subject, and lens barrels including the optical lens. The lens barrels perform a zoom operation while moving along an optical axis direction. Also, the barrel module includes a focus lens and a focus lens barrel including the focus lens. The focus lens barrel adjusts a focus while moving between an image pickup device and another lens barrel.

When an external force is applied to the barrel module including the plurality of lens barrels, in a direction that the lens barrels are disposed, the lens barrels collide with each other, and thus the barrel module may be damaged.

SUMMARY OF THE INVENTION

The present invention provides a barrel module for preventing a plurality of lens barrels in the barrel module from being damaged due to a collision therebetween, and an imaging apparatus.

According to an aspect of the present invention, there is provided a barrel module including: a base having a surface on which an image pickup device is disposed; a lens barrel disposed on the base; a driver for providing driving power to move the lens barrel up and down over the base; a clip connected to the driver to be disposed between the driver and the lens barrel; and an elastic member for providing elasticity between the lens barrel and the clip, wherein the lens barrel moves from an original position toward the base when an external force is applied, and when the external force is removed, the lens barrel goes back to the original location due to the elasticity of the elastic member.

The base may include: an accommodator for accommodating the image pickup device; first and second guide bars formed on the accommodator toward the lens barrel and spaced apart from each other; and a guide rib formed on the accommodator toward the lens barrel, and for providing a moving path for the clip while engaging with the clip, wherein the first and second guide bars may guide a moving path of the lens barrel by connecting with the lens barrel.

The lens barrel may include: a center portion to which a lens is installed; and a curved portion extending from the center portion and having a depression formed on a side of the curved portion to connect to the guide rib.

The lens barrel may further include first and second connectors respectively connected to the first and second guide bars so that the lens barrel moves along the first and second guide bars.

The driver may include: an actuator for providing the driving power as rotatory power; and a shaft connected to the actuator to rotate based on an axis in a length direction of the shaft according to the rotatory power, wherein a screw thread may be formed on a perimeter of the shaft to be screwed to the clip.

The clip may include: a body portion having a through hole having an inner surface on which a screw thread is formed to be screwed to the shaft; and a depressed portion formed as a depression on a side of the body portion to be connected to the guide rib and moved along the guide rib.

One end of the elastic member may be connected to the driver and another end may be connected to the lens barrel.

The driver may further include a first fixer to be connected to the end of the elastic member.

The lens barrel may further include a second fixer to be connected to the other end of the elastic member.

The elastic member may be a coil spring.

The clip and the lens barrel may be adhered to each other magnetically.

The barrel module may further include: a first magnetic body disposed on a surface of the lens barrel facing the clip; and a second magnetic body disposed on a surface of the clip facing the first magnetic body, wherein the clip and the lens barrel may be adhered to each other magnetically via the first and second magnetic bodies.

The clip and the lens barrel may be formed of a magnetic material to be adhered to each other magnetically.

According to another aspect of the present invention, there is provided an imaging apparatus including the barrel module.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Figure 1:
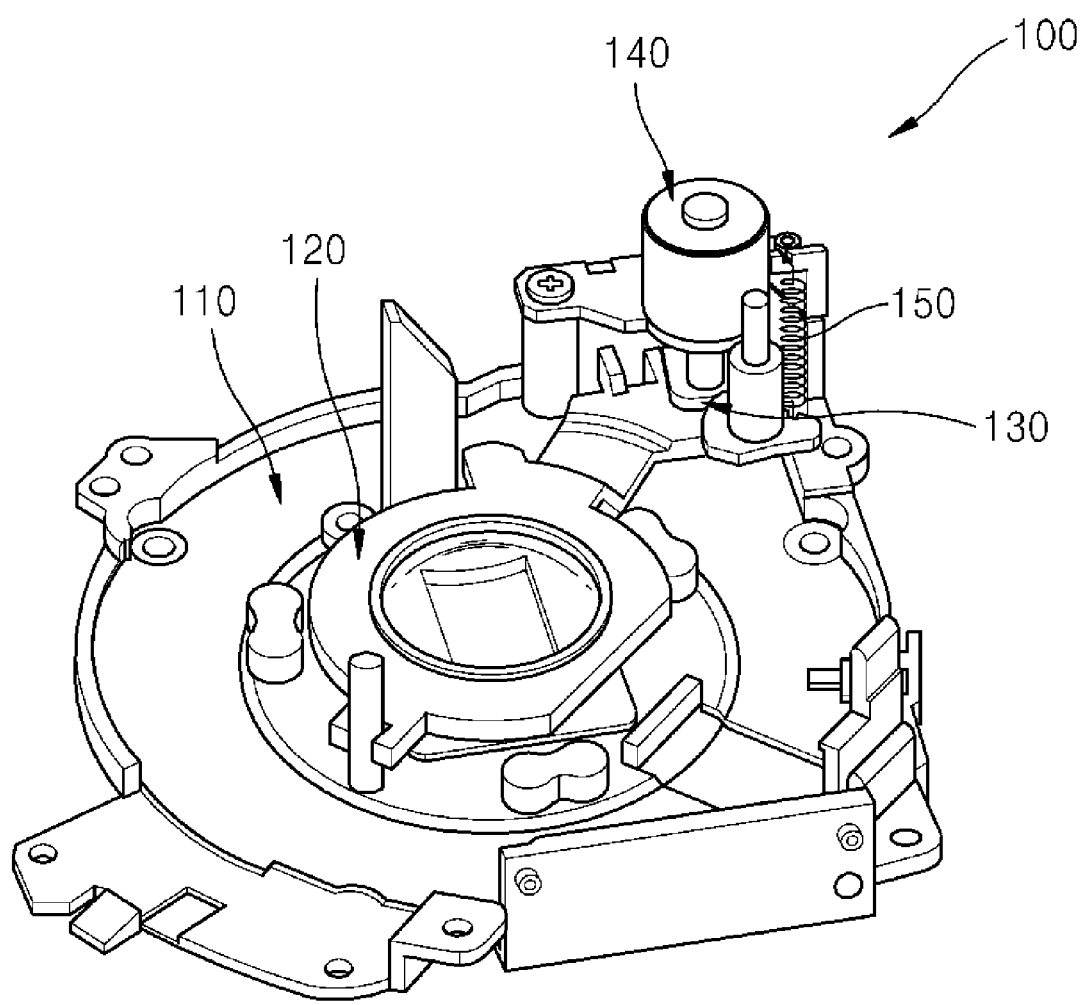
FIG. 1 is a perspective view schematically illustrating a barrel module according to an embodiment of the present invention.

Hereinafter, the present invention will be described more fully with reference to the accompanying drawings, in which exemplary embodiments of the invention are shown. The invention may, however, be embodied in many different forms and should not be construed as being limited to the embodiments set forth herein; rather, these embodiments are provided so that this disclosure will be thorough and complete, and will fully convey the concept of the invention to those skilled in the art. In the drawings, like reference numerals denote like elements, and the sizes and thicknesses of layers and regions are exaggerated for clarity.

FIG. 1 is a perspective view schematically illustrating a barrel module 100 according to an embodiment of the present invention.

Referring to FIG. 1, the barrel module 100 according to the current embodiment of the present invention includes a base 110, a lens barrel 120, a driver 140, a clip 130, and an elastic member 150. Although not illustrated in FIG. 1, the barrel module 100 may further include a housing for covering the base 110, and a plurality of lens barrels disposed inside the housing.

Figure 2:
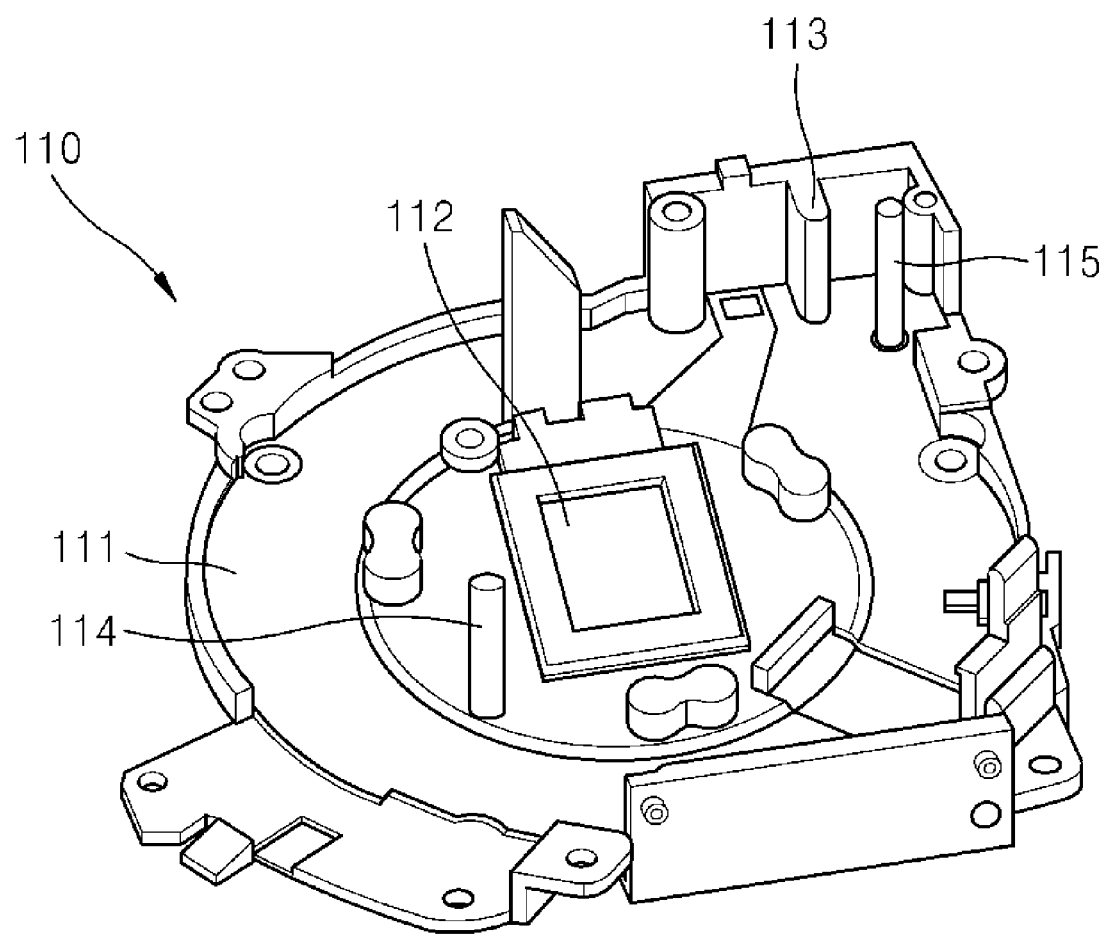
FIG. 2 is a perspective view of a base of FIG. 1.

FIG. 2 is a perspective view of the base 110 of FIG. 1. Referring to FIG. 2, the base 110 may include an accommodator 111, a guide rib 113, a first guide bar 114, and a second guide bar 115.

The accommodator 111 provides a surface for accommodating an image pickup device 112. The accommodator 111 may be a bottom surface of the barrel module 100. A housing (not shown) may be disposed on the accommodator 111, and a plurality of lens barrels (not shown) may be disposed inside the housing.

Figure 3:
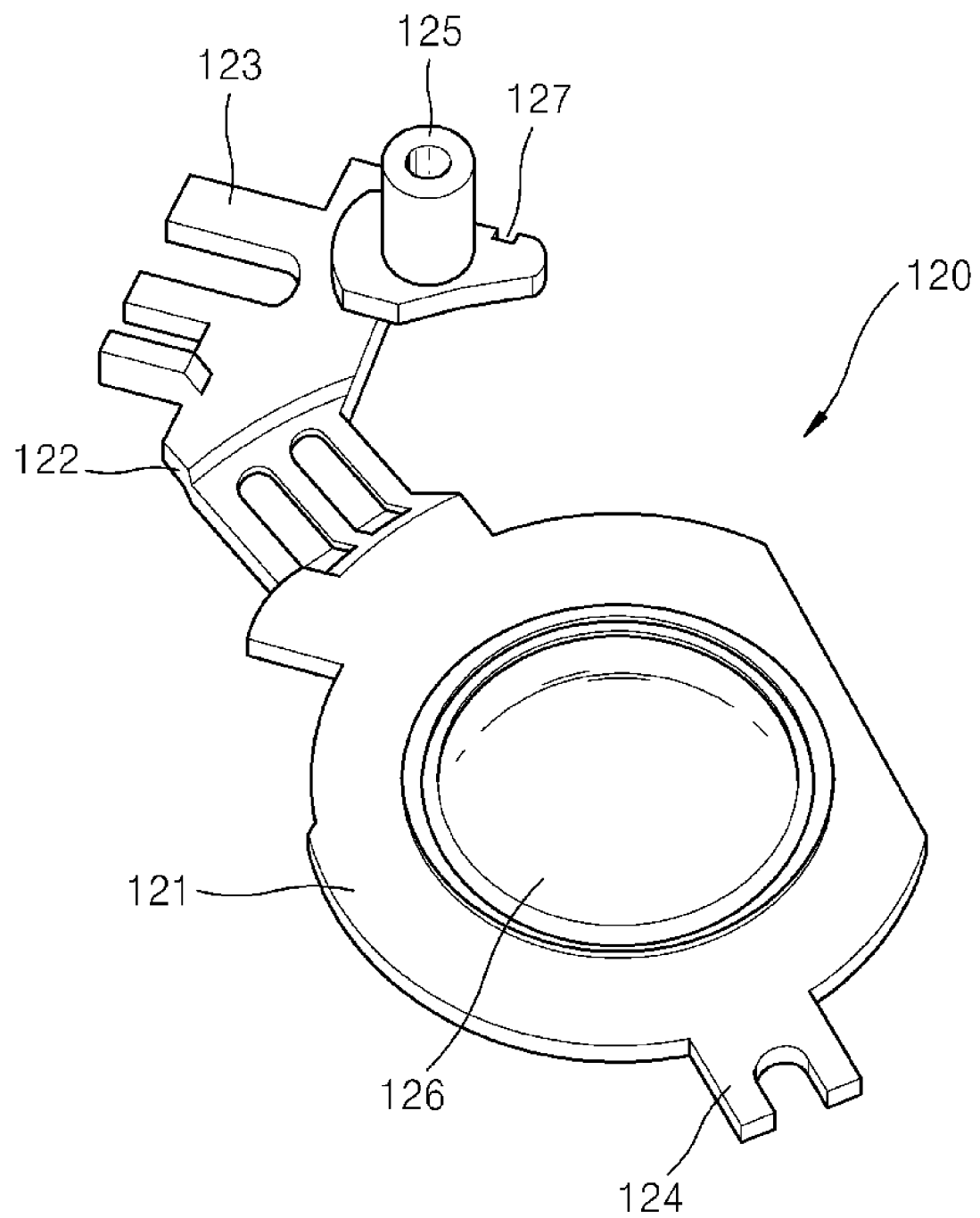
FIG. 3 is a perspective view schematically illustrating a lens barrel of FIG. 1.

The guide rib 113 may extend perpendicularly from one side of the accommodator 1111. The guide rib 113 shown in FIG. 2 extends from a side of the accommodator 111, but is not limited thereto and may be formed inside the accommodator 111. The guide rib 113 extends toward the lens barrel 120 from the accommodator 111, and provides a moving path for the clip 130 while being engaged with the clip 130. Also, the guide rib 113 provides a moving path for the lens barrel 120 while being engaged with a curved portion 123 of the lens barrel 120 as shown in FIG. 3.

The first and second guide bars 114 and 115 may extend from one side of the accommodator 111 toward the lens barrel 120. The first and second guide bars 114 and 115 may extend perpendicularly from a side of the accommodator 111 toward the lens barrel 120. The first and second guide bars 114 and 115 are spaced apart from each other. The first and second guide bars 114 and 115 are connected to the lens barrel 120 to provide the moving path for the lens barrel 120 to move up and down over the accommodator 111.

The lens barrel 120 may adjust a focus while moving up and down over the base 110. FIG. 3 is a perspective view schematically illustrating the lens barrel 120 of FIG. 1. Referring to FIG. 3, the lens barrel 120 may include a center portion 121, an extending portion 122, and the curved portion 123, and first and second connectors 124 and 125. The lens barrel 120 may be an auto focus lens barrel.

A lens 126 is installed on the center portion 121. A light penetrating through the lens 126 forms an image on the image pickup device 112.

The extending portion 122 may externally extend from one side of the center portion 121.

The curved portion 123 may be formed as a depression on one side of the extending portion 122 so as to engage with the guide rib 113. A shape of the curved portion 123 corresponds to a shape of the guide rib 113. For example, since the guide rib 113 has a semicircular pillar shape as shown in FIG. 2, the curved portion 123 may be formed in such a way as to be engaged with the semiconductor pillar shape.

The curved portion 123 may move up and down along the guide rib 113 while being engaged with the guide rib 113.

In FIG. 3, the curved portion 123 is formed on one side of the extending portion 122, but is not limited thereto, and may be formed as a depression on one side of the center portion 121.

The first and second connectors 124 and 125 are respectively connected to the first and second guide bars 114 and 115, and may respectively move along the first and second guide bars 114 and 115. Since the first and second guide bars 114 and 115 have pillar shapes extending perpendicularly from the accommodator 111 toward the lens barrel 120, the first and second connectors 124 and 125 may be shaped as depressions or through holes to be connected to the first and second guide bars 114 and 115 having the pillar shapes. Referring to FIG. 3, one side of the center portion 121 is extended, and the first connector 124 is formed as a depression on the extended side of the center portion 121, and the second connector 125 if formed as a through hole through which the second guide bar 115 penetrates. The shapes of the first and second connectors 124 and 125 are not limited thereto and may be various as long as the first and second connectors 124 and 125 respectively may move along the first and second guide bars 114 and 115 while connected to the first and second guide bars 114 and 115 according to the shapes of the first and second guide bars 114 and 115.

Figure 4:
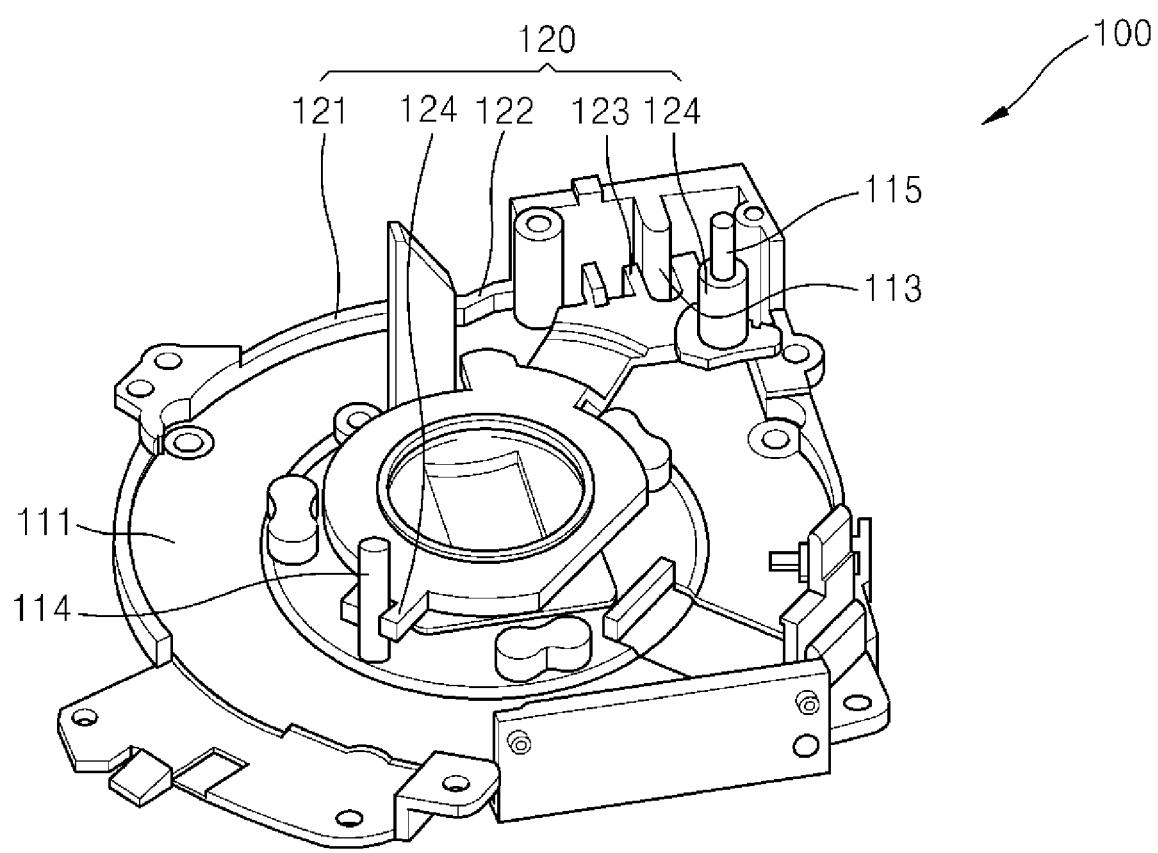
FIG. 4 is a perspective view of the base and the lens barrel of FIG. 1 connected to each other.

FIG. 4 is a perspective view of the base 110 and the lens barrel 120 of FIG. 1 connected to each other. Referring to FIG. 4, the lens 126 of the lens barrel 120 is disposed corresponding to the image pickup device 112 of the base 110, and the curved portion 123 is engaged with the guide rib 113. Also, the first and second connectors 124 and 125 are respectively connected to the first and second guide bars 114 and 115. Accordingly, when a driving power of the driver 140 is applied to the lens barrel 120, the lens barrel 120 is moved up and down over the base 110. Also, the guide rib 113 and the first and second guide bars 114 and 115 provide the moving path for the lens barrel 120, and enable the lens barrel 120 to be moved parallel to the image pickup device 112 even when the lens barrel 120 is moved.

The clip 130 is disposed between the driver 140 and the lens barrel 120, and is screwed to the driver 140. Accordingly, the clip 130 moves up and down according to the rotatory power generated by the driver 140.

Figure 5:
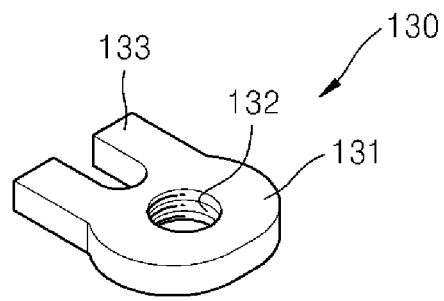
FIG. 5 is a perspective view schematically illustrating a clip of FIG. 1.

FIG. 5 is a perspective view schematically illustrating the clip 130 of FIG. 1. Referring to FIG. 5, the clip 130 includes a body portion 131, a through hole 132, and a depressed portion 133.

Figure 7:
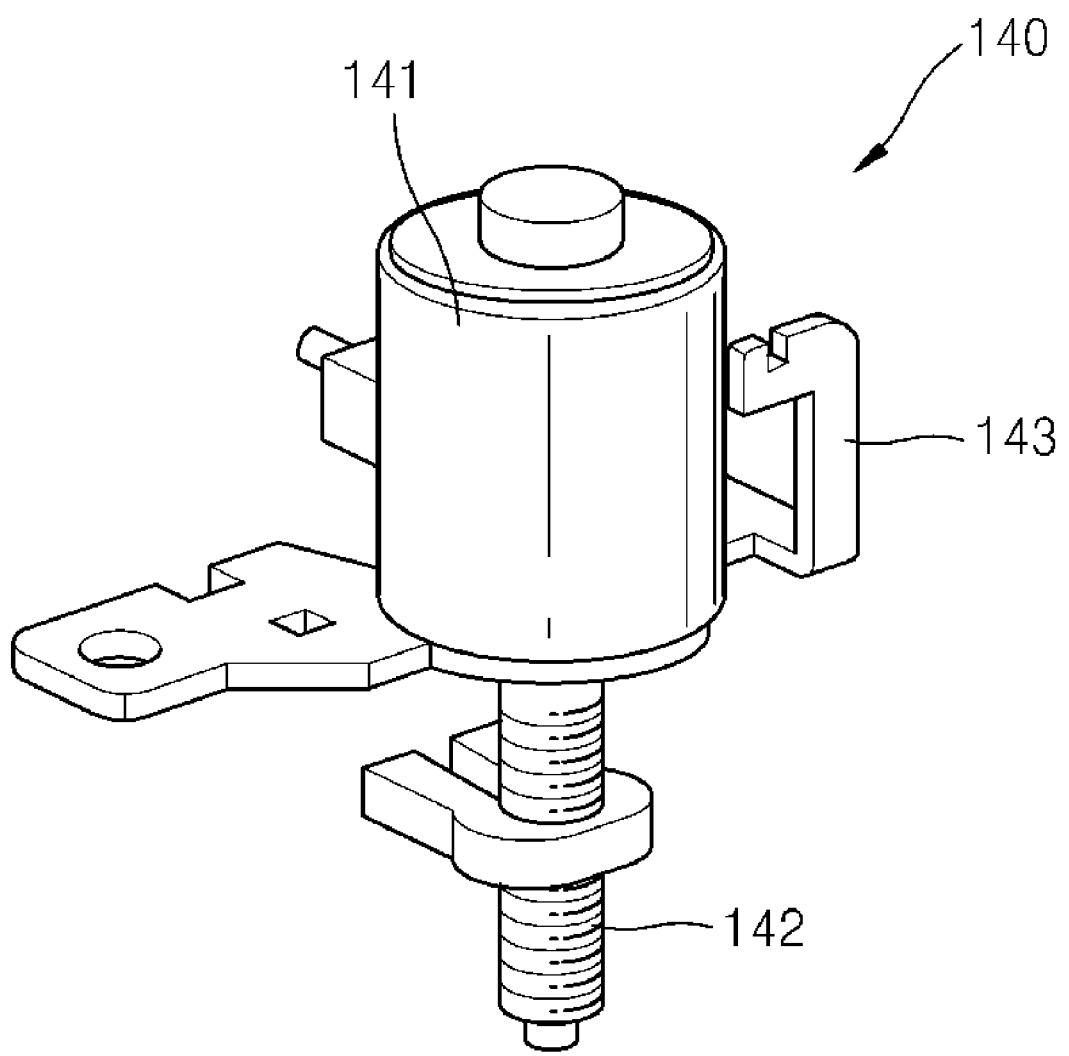
FIG. 7 is a perspective view schematically illustrating a driver of FIG. 1.

The body portion 131 includes the through hole 132 through which a shaft 142 of the driver 140, as shown in FIG. 7, penetrates to be combined with the body portion 131. A screw thread (not shown) is formed on a perimeter of the through hole 132, and the screw thread of the through hole 132 fits with a screw thread (not shown) formed on the shaft 142.

The depressed portion 133 extends from one side of the body portion 131 and is formed as a depression on the extended side. The depressed portion 133 may be connected to the guide rib 113. Since the depressed portion 133 is connected to the guide rib 113, the clip 130 moves up and down along the guide rib 113 when the shaft 142 screwed to the through hole 132 is rotated.

Figure 6:
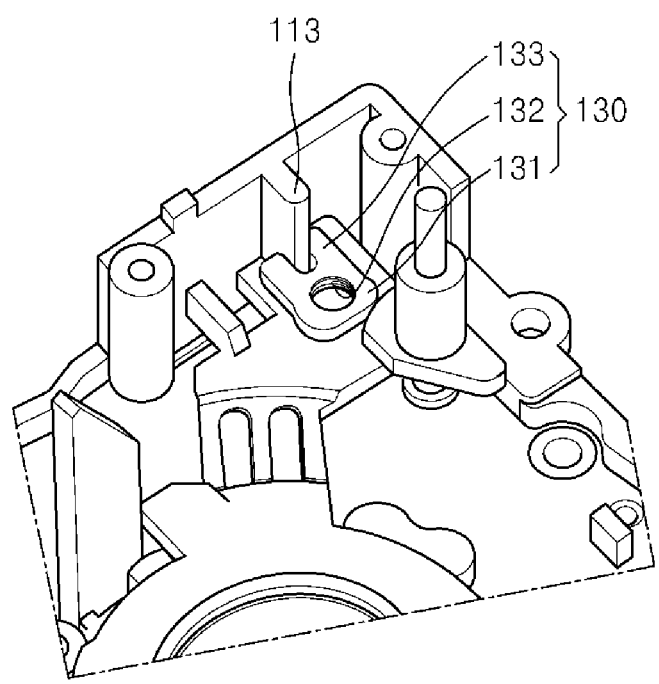
FIG. 6 is a perspective view of the base, the lens barrel, and the clip of FIG. 1 connected to each other.

FIG. 6 is a perspective view of the base 110, the lens barrel 120, and the clip 130 of FIG. 1 connected to each other. Referring to FIG. 6, the lens barrel 120 and the clip 130 are sequentially disposed on the base 110. In detail, the lens barrel 120 is disposed on the base 110. The curved portion 123 of the lens barrel 120 is disposed connected to the guide rib 113 of the base 110. The clip 130 is disposed on the lens barrel 120 while the depressed portion 133 of the clip 130 is connected to the guide rib 113. In other words, the lens barrel 120 and the clip 130 are sequentially disposed on the base 110, and the curved portion 123 of the lens barrel 120 and the depressed portion 133 of the clip 130 are engaged with the guide rib 113 of the base 110. Accordingly, the lens barrel 120 and the clip 130 may move up and down along the guide rib 113. As such, since the lens barrel 120 and the clip 130 move while being engaged with the guide rib 113, the lens barrel 120 and the clip 130 may move stably and precisely.

The driver 140 provides driving power to the lens barrel 120 to move the lens barrel 120 up and down over the base 110. FIG. 7 is a perspective view schematically illustrating the driver 140 of FIG. 1. Referring to FIG. 7, the driver 140 includes an actuator 141, the shaft 142, and a first fixer 143.

The actuator 141 may provide driving power as rotatory power. The actuator 141 may be a motor providing the rotatory power according to external electricity.

The shaft 142 rotates based on an axis in a length direction of the shaft 142 by being connected to the actuator 141. In other words, the rotatory power of the actuator 141 is applied to the shaft 142, and the shaft 142 rotates based on the axis in the length direction of the shaft 142. The length direction of the shaft 142 is perpendicular to the base 110. The length direction of the shaft 142 may be perpendicular to the accommodator 111 of the base 110.

The screw thread of the shaft 142 is screwed to the through hole 132 of the clip 130. Also, the depressed portion 133 of the clip 130 is engaged with the guide rib 113, and thus when the shaft 142 rotates, the clip 130 moves up or down along the guide rib 113 according to a rotation direction of the shaft 142.

The shaft 142 penetrates through a space between the curved portion 123 of the lens barrel 120 and the guide rib 113. Here, since a screw thread is not formed on the curved portion 123 of the lens barrel 120, the shaft 142 and the lens barrel 120 are not screwed to each other.

The elastic member 150 provides elasticity between the lens barrel 120 and the clip 130 so that the lens barrel 120 may be adhered to the clip 130. Referring to FIG. 1, the elastic member 150 is disposed between the driver 140 and the lens barrel 120, wherein one end of the elastic member 150 is connected to the driver 140 and another end of the elastic member 150 is connected to the lens barrel 120. The driver 140 includes the first fixer 143 to be connected to the end of the elastic member 150. Also, the lens barrel 120 includes a second fixer 127 to be connected to the other end of the elastic member 150.

According to the barrel module 100 of an embodiment of the present invention, the shaft 142 of the driver 140 is screwed to the clip 130, but is not screwed to the lens barrel 120, and thus the lens barrel 120 does not directly move according to the driving power of the driver 140. In other words, only the clip 130 screwed to the driver 140 moves according to the driving power of the driver 140, and the lens barrel 120 disposed below the clip 130 moves up and down as the clip 130 moves up and down. When the clip 130 is moved up by the driver 140, the lens barrel 120 is moved up while touching a bottom surface of the clip 130 due to the elasticity of the elastic member 150. On the other hand, when the clip 130 is moved down by the driver 140, the lens barrel 120 is moved down with the clip 130, but since the elasticity is supplied by the elastic member 150 toward the clip 130, the lens barrel 120 is moved down while touching the bottom surface of the clip 130. As such, the lens barrel 120 is moved up and down along the clip 130 according to the driving power of the driver 140 and the elasticity of the elastic member 150.

When an external force is applied to the barrel module 100, the lens barrel 120 may move toward the base 110, and when the external force is removed, the lens barrel 120 goes back to the bottom surface of the clip 130, which is the original location of the lens barrel 120 before the external force is applied. This is because the lens barrel 120 is not screwed to the shaft 142 of the driver 140, and is supported by the elastic member 150. In other words, only the clip 130 is screwed to the shaft 142 of the driver 140, and the lens barrel 120 is not screwed to the shaft 142 and maintains its location by the elastic member 150. Accordingly, when the external force is applied to the barrel module 100, the lens barrel 120 moves toward the base 110 without being affected by the shaft 142 of the driver 140, and the clip 130 maintains its location since the clip 130 is screwed to the shaft 142. When the external force is removed, the lens barrel 120 goes back to its original location according to the elasticity of the elastic member 150.

Consequently, even when an external force is applied to the barrel module 100, the lens barrel 120 moves independently of the clip 130, and thus the barrel module 100 is prevented from being damaged as the lens barrels 120 collide with each other.

Also, when the external force is removed, the lens barrel 120 goes back to its original location due to the elastic member 150, and thus the location of the lens barrel 120 does not need to be adjusted.

The lens barrel 120 and the clip 130 may be each formed of a magnetic material. Here, the lens barrel 120 and the clip 130 may be adhered to each other magnetically. A portion of the lens barrel 120 that is adhered to the clip 130, i.e., the curved portion 123, may be formed of a magnetic material. Since the lens barrel 120 and the clip 130 are adhered to each other magnetically, the lens barrel 120 and the clip 130 are separated from each other only when an external force stronger than the magnetic attraction between the lens barrel 120 and the clip 130 is applied to the barrel module 100. Accordingly, an external force weaker than the magnetic attraction between the lens barrel 120 and the clip 130 does not affect the adhesion of the lens barrel 120 and the clip 130, and thus the lens barrel 120 is prevented from being moved relative to the barrel module 100 when the barrel module 100 is slightly shaken. Also, the lens barrel 120 quickly goes back to its original location after the lens barrel 120 and the clip 130 are separated from each other, since the lens barrel 120 and the clip 130 are magnetically attracted to each other.

Figure 8:
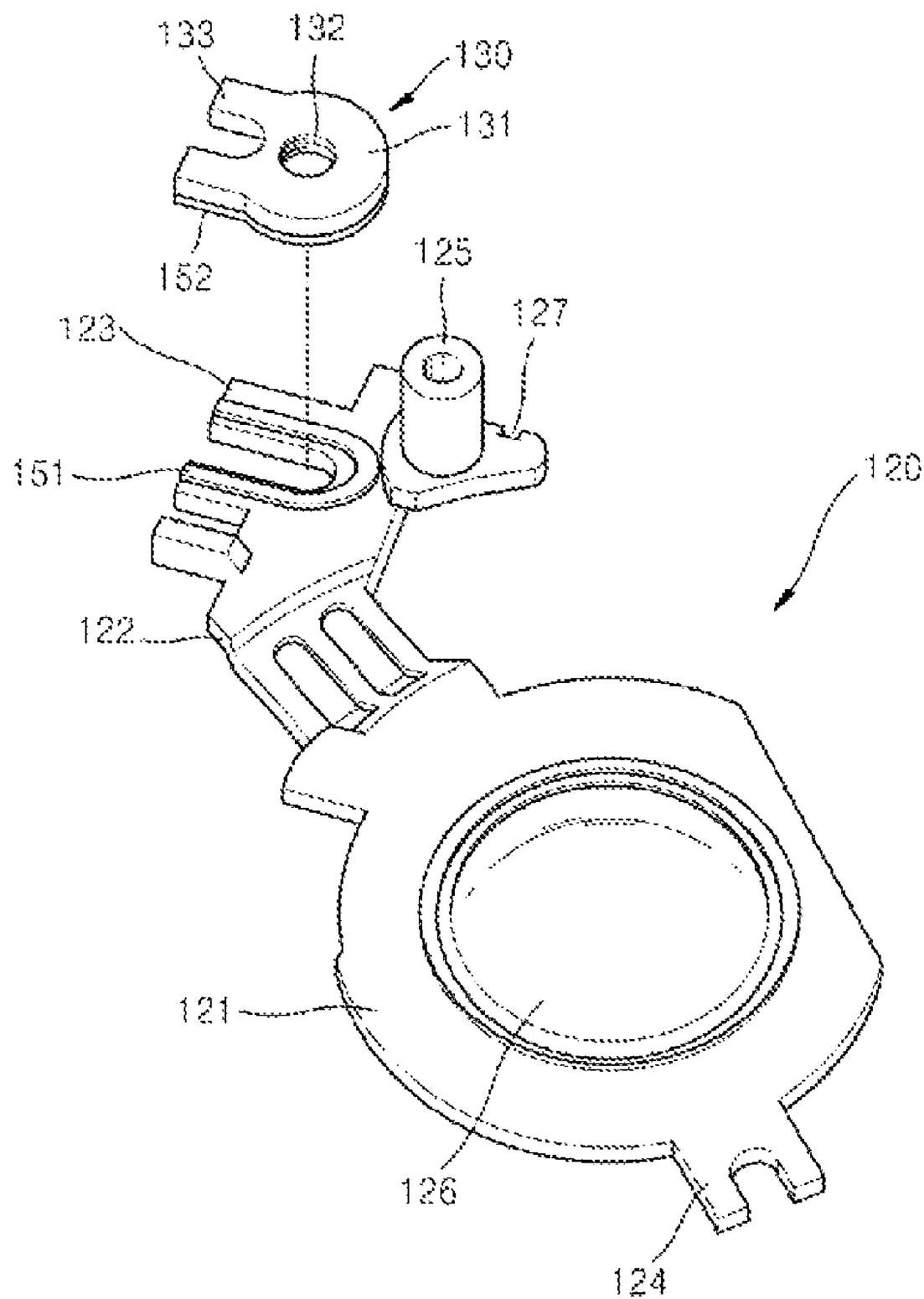
FIG. 8 is a perspective view illustrating modified examples of the lens barrel and the clip of FIG. 1.

FIG. 8 is a perspective view illustrating modified examples of the lens barrel 120 and the clip 130 of FIG. 1.

Referring to FIG. 8, a first magnetic body 151 may be disposed on one side of the lens barrel 120. In other words, the first magnetic body 151 may be disposed on a surface of the lens barrel 120 that faces the clip 130. The clip 130 contacts the curved portion 123 of the lens barrel 120, and thus the first magnetic body 151 may be disposed on a side of the curved portion 123 facing the clip 130.

The second magnetic body 152 may be disposed on a side of the clip 130 facing the first magnetic body 151. In other words, the first and second magnetic bodies 151 and 152 may face each other and be adhered to each other magnetically. Surfaces of the first and second magnetic bodies 151 and 152 that face have opposite polarities. In other words, when the surface of the first magnetic body 151 that faces the second magnetic body 152 is a south pole, the surface of the second magnetic body 152 that faces the first magnetic body 151 is a north pole. Alternatively, when the surface of the first magnetic body 151 that faces the second magnetic body 152 is a north pole, the surface of the second magnetic body 152 that faces the first magnetic body 151 is a south pole. As such, since the first and second magnetic bodies 151 and 152 have opposite polarities, they are attracted to each other magnetically, and as a result, the lens barrel 120 and the clip 130 may be adhered to each other.

An impact preventing member (not shown) may be further disposed between the lens barrel 120 and the base 110. When the lens barrel 120 is pushed toward the base 110 by an external force, the impact preventing member disposed between the lens barrel 120 and the base 110 may prevent the lens barrel 120 from directly bumping into the base 110 and thus prevents the lens barrel 120 from impacting the base 110 and being damaged. The impact preventing member may be formed of a material having elasticity to absorb an impact.

The barrel module 100 may not only be applied to a digital camera, but also to various apparatuses for photographing an image, such as a built-in camera used in a mobile phone.

According to the present invention, lens barrels included in a barrel module are prevented from being damaged by preventing the lens barrel from impacting each other due to an external force.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A barrel module comprising:
    a base having a surface on which an image pickup device is disposed;
    a lens barrel disposed on the base;
    a driver for providing driving power to move the lens barrel up and down over the base;
    a clip connected to the driver to be disposed between the driver and the lens barrel; and
    an elastic member for providing elasticity between the lens barrel and the clip,
    wherein:
        the lens barrel moves from an original position toward the base when an external force is applied, and when the external force is removed, the lens barrel goes back to the original location due to the elasticity of the elastic member; and
        the base comprises:
            an accommodator for accommodating the image pickup device; and
            a guide rib formed on the accommodator toward the lens barrel, and for providing a moving path for the clip while engaging with the clip.

2. The barrel module of claim 1, wherein the base further comprises:
    first and second guide bars formed on the accommodator toward the lens barrel and spaced apart from each other; and
    wherein the first and second guide bars guide a moving path of the lens barrel by connecting with the lens barrel.

3. The barrel module of claim 2, wherein the lens barrel comprises:
    a center portion to which a lens is installed; and
    a curved portion extending from the center portion and having a depression formed on a side of the curved portion to connect to the guide rib.

4. The barrel module of claim 3, wherein the lens barrel further comprises first and second connectors respectively connected to the first and second guide bars so that the lens barrel moves along the first and second guide bars.

5. The barrel module of claim 2, wherein the driver comprises:
    an actuator for providing the driving power as rotatory power; and
    a shaft connected to the actuator to rotate based on an axis in a length direction of the shaft according to the rotatory power,
    wherein a screw thread is formed on a perimeter of the shaft to be screwed to the clip.

6. The barrel module of claim 5, wherein the clip comprises:
    a body portion having a through hole having an inner surface on which a screw thread is formed to be screwed to the shaft; and
    a depressed portion formed as a depression on a side of the body portion to be connected to the guide rib and moved along the guide rib.

7. The barrel module of claim 1, wherein one end of the elastic member is connected to the driver and another end is connected to the lens barrel.

8. The barrel module of claim 7, wherein the driver further comprises a first fixer to be connected to the end of the elastic member.

9. The barrel module of claim 7, wherein the lens barrel further comprises a second fixer to be connected to the other end of the elastic member.

10. The barrel module of claim 1, wherein the elastic member is a coil spring.

11. The barrel module of claim 1, wherein the clip and the lens barrel are adhered to each other magnetically.

12. The barrel module of claim 11, further comprising:
    a first magnetic body disposed on a surface of the lens barrel facing the clip; and
    a second magnetic body disposed on a surface of the clip facing the first magnetic body,
    wherein the clip and the lens barrel are adhered to each other magnetically via the first and second magnetic bodies.

13. The barrel module of claim 1, wherein the clip and the lens barrel are formed of a magnetic material to be adhered to each other magnetically.

14. An imaging apparatus including the barrel module according to claim 1.

* * * * *